Patented July 14, 1936

2,047,513

UNITED STATES PATENT OFFICE 2,047,513

ARYLAMIDES OF AN ASYMMETRICAL ORTHO-XYLENOL-CARBOXYLIC ACID AND PROCESS OF MAKING SAME

Leopold Laska and Oskar Haller, Offenbach-on-the-Main, Germany, assignors to General Aniline Works, Inc., New York, N. Y., a corporation of Delaware No Drawing. Application June 27, 1930, Serial No. 464,421. In Germany July 2, 1929

18 Claims. (Cl. 260—124)

The present invention relates to arylamides derived from an asymmetrical ortho-xylenol-carboxylic acid having probably the constitution of 1.2-dimethyl-4-hydroxy-benzene-5-carboxylic acid, and to a process of making them.

This process comprises heating the above mentioned acid with an arylamine in the presence of a condensing agent, advantageously with the addition of a solvent or diluent. Instead of the free acid its chloride may be also used.

Suitable arylamines are, for instance, aniline, its derivatives containing substituents other than sulfonic or carboxylic acid groups, for instance, alkyl, alkoxy, halogen, nitro, hydroxy. Furthermore may be named naphthylamines, aminonaphthols and diamines of the benzene, naphthalene or diphenyl series or diamines derived from a system of rings attached to each other by an intermediate group, as diamino-diphenylamine, diamino-carbazole.

The new arylamides of this invention correspond to the probable general formula:

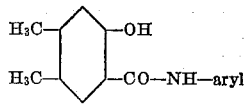

wherein the aryl radical may contain substituents other than sulfonic or carboxylic acid groups. They surpass the known arylamides of ortho-hydroxy-carboxylic acids of the benzene series by a greater affinity for the vegetable fiber. In consequence of this property the arylamides of the present invention may be used for the production of ice-colors according to the so-called wet-dyeing method according to which it is not necessary to dry the impregnated fiber before developing it with the diazo compound.

In order to further illustrate our invention the following examples are given, the parts being by weight and all temperatures in centigrade degrees, but we wish it to be understood that we are not limited to the particular products or reaction conditions mentioned therein:—

Example 1

83 parts of 2-hydroxy-4.5-dimethyl-benzenecarboxylic acid, and 46.5 parts of aniline are added to 500 parts of toluene, and the mixture is heated to about 60–70°. At this temperature 30 parts of phosphorus trichloride are slowly added drop by drop. The temperature is gradually raised until the boiling point and this temperature is maintained for about 8 hours. The reaction mass is made alkaline by means of a solution of sodium carbonate and the toluene is blown away by means of steam. The anilide of the ortho-xylenol-carboxylic acid thus obtained is filtered and may be purified by dissolving it in a caustic alkali lye and precipitating with acid. It corresponds probably to the formula:

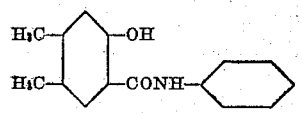

When recrystallized from toluene it melts at 178°.

Example 2

166 parts of the ortho-xlenol-carboxylic acid used in Example 1 and 109 parts of 3-aminophenol are added to 1200 parts of dimethyl-aniline; 60 parts of phosphorus trichloride are slowly added drop by drop at 70–80° and the mixture is heated to about 100° for some hours. The reaction mixture is introduced into an excess of dilute hydrochloric acid. The precipitate is filtered by suction and freed from any residual dimethyl-aniline by steam distillation after being rendered alkaline with a solution of sodium carbonate. The remaining arylamide is dissolved in caustic alkali lye and precipitated therefrom by means of an acid. It corresponds probably to the formula:

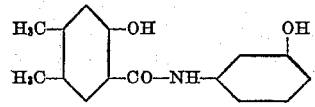

and melts when recrystallized from xylene at 2-8-219°.

Example 3

166 parts of the ortho-xylenol-carboxylic acid used in Example 1 and 159 parts of 7-amino-1-naphthol are added to 1500 parts of dichlorobenzene. At 60–70°, 60 parts of phosphorus trichloride are allowed to run in slowly and the whole is heated to 110° for some hours until the evolution of hydrochloric acid has ceased. The reaction mixture is made alkaline with a solution of sodium carbonate and the ortho-dichlorobenzene is blown away by means of steam. The condensation product thus obtained is purified by dissolving it in a caustic soda lye. It corresponds probably to the formula:

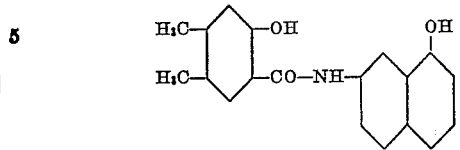

and melts when recrystallized from xylene at 185°.

Example 4

166 parts of ortho-xylenol-carboxylic acid are introduced into 800 parts of aniline, the temperature is raised to 70° and, after having slowly added 60 parts of phosphorus trichloride, kept for about 8 hours at 100°. The reaction mass is made alkaline with a solution of sodium carbonate and freed from aniline by steam distillation. The remaining anilide of the ortho-xylenol-carboxylic acid may be purified by dissolving it in a caustic soda lye. It is identical with the product of Example 1.

Example 5

166 parts of ortho-xylenol-carboxylic acid are melted together with 127 parts of p-chloro-aniline at 80°. 60 parts of phosphorus trichloride are slowly added drop by drop to the melt during which the reaction temperature is kept at 90°. The whole is heated still for some hours at 100° until the evolution of hydrochloric acid has ceased, the reaction product is rendered alkaline with a solution of sodium carbonate and freed from any unchanged p-chloro-aniline by washing the precipitate with hot hydrochloric acid. The p-chloro-anilide thus obtained may be purified by dissolving it in a caustic soda lye. It corresponds probably to the formula:

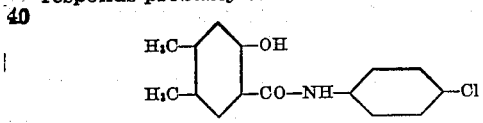

When recrystallized from xylene it melts at 209–210°.

Example 6

83 parts of ortho-xylenol-carboxylic acid are added to 750 parts of toluene with the addition of 53 parts of ortho-tolidine, 30 parts of phosphorus trichloride are allowed to run in slowly at 60–70° and the whole is heated for some hours to boiling. After the evolution of hydrochloric acid has ceased the reaction mixture is made alkaline by the addition of a solution of sodium carbonate. The toluene is blown away by means of steam and the remaining ortho-tolidide of the xylenol-carboxylic acid is dissolved in a caustic alkali lye. It corresponds probably to the formula:

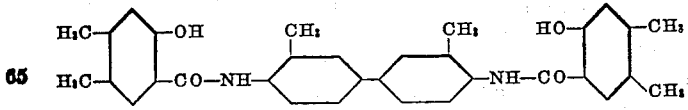

It melts at 296–297°.

Example 7

55.3 parts of the ortho-xylenol-carboxylic acid of the above constitution are added with 47.6 parts of 2-naphthylamine to 500 parts of toluene. At 60°, 20 parts of phosphorus trichloride are allowed to run in slowly. Then the temperature is raised to 110° and the whole is heated until the evolution of hydrochloric acid has ceased. The reaction mixture is made alkaline with a solution of sodium carbonate, the toluene is blown away and the residue recrystallized from xylene. In this manner the 2-naphthylamide of 1.2-dimethyl-4-hydroxy-benzene-5-carboxylic acid is obtained. It corresponds probably to the formula:

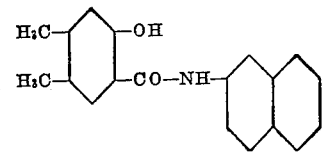

and melts at 214–215°.

The following table shows the properties of some further arylamides of the ortho-xylenol-carboxylic acid prepared by the present process:—

| Ortho-xylenol-carboxylic acid of the said constitution condensed with— | Recrystallized from— | Melting point |
|---|---|---|
| | | ° C. |
| 2-amino-toluene | Benzene | 140 |
| 3-amino-toluene | Dichlorobenzene | 202–203 |
| 4-amino-toluene | Xylene | 194–195 |
| 1.3-dimethyl-4-amino-benzene | Xylene | 175–176 |
| 2-chloro-aniline | Benzene | 189–190 |
| 3-chloro-aniline | Xylene | 198–200 |
| 2-amino-anisole | Xylene | 159–160 |
| 4-amino-anisole | Xylene | 177–178 |
| 3-nitro-aniline | Dichlorobenzene | 245–246 |
| 4-nitro-aniline | Dichlorobenzene | 267–269 |
| 4-chloro-2-amino-toluene | Xylene | 192–193 |
| 5-chloro-2-amino-toluene | Xylene | 207–208 |
| 4-chloro-2-amino-anisole | Xylene | 220 |
| 5-chloro-2-amino-anisole | Benzene | 170 |
| Amino-hydroquinone-dimethylether | Benzene | 120–121 |
| 5-chloro-2-amino-1.4-dimethoxybenzene | Benzene | 180–181 |
| 1-methoxy-2-amino-4-nitrobenzene | Dichlorobenzene | 266–268 |
| 1-methoxy-2-amino-5-nitrobenzene | Dichlorobenzene | 165–167 |
| 1-methyl-2-amino-5-nitrobenzene | Dichlorobenzene | 251–252 |
| 1-methyl-2-amino-4-nitrobenzene | Dichlorobenzene | 191–192 |
| 1-methyl-2-nitro-4-aminobenzene | Dichlorobenzene | 230–231 |
| 1-naphthylamine | Dichlorobenzene | 199–200 |
| 2-amino-7-naphthol | Xylene | 194–195 |
| 2.5-dichloro-1.4-phenylene-diamine | Dichlorobenzene | 250 |
| 1-methoxy-4-chloro-2.5-diamino-benzene | Dichlorobenzene | 310–315 |
| 2.5-diamino-hydroquinone-dimethylether | Dichlorobenzene | 308–310 |
| 4-chloro-1-methyl-2.5-diamino-benzene | Dichlorobenzene | 288–290 |

We claim:—

1. Process which comprises heating 2-hydroxy-4.5-dimethyl-benzene-carboxylic acid, with an aromatic amino compound of the benzene or naphthalene series which must not contain sulfonic or carboxylic acid groups, in the presence of phosphorus trichloride.

2. Process which comprises heating 2-hydroxy-4.5-dimethyl-benzene-carboxylic acid, with 2-amino-naphthalene in the presence of phosphorus trichloride.

3. As new compounds the arylamides of ortho-xylenol-carboxylic acid corresponding probably to the general formula:

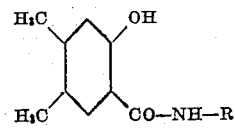

wherein R means a radical of the benzene or naphthalene series which must not contain sulfonic or carboxylic acid groups, which compounds are insoluble in water, soluble in caustic alkali solutions, showing when recrystallized from an organic solvent a definite melting point.

4. As a new compound the 2-naphthylamide of ortho-xylenol-carboxylic acid corresponding probably to the formula:

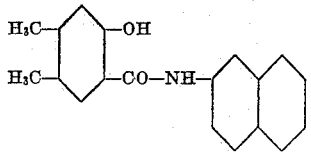

which compound is insoluble in water, soluble in caustic alkali solutions, melting when recrystallized from xylene at 214–215°.

5. As a new compound, the 4-chloro-2.5-dimethoxy-anilide of ortho-xylenol-carboxylic acid corresponding probably to the formula:

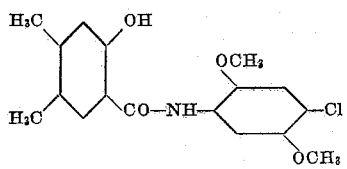

which compound is insoluble in water, soluble in caustic alkali solutions, melting when recrystallized from benzene at 180° to 181°.

6. As a new compound, the 1-naphthylamide of ortho-xylenol-carboxylic acid corresponding probably to the formula:

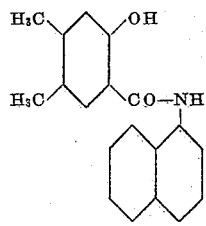

which compound is insoluble in water, soluble in caustic alkali solutions, melting when recrystallized from dichlorobenzene at 199° to 200°.

7. Process for the manufacture of unsulphonated diacylated diamines of the general formula

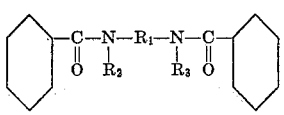

wherein each benzene nucleus carries an OH-group, and wherein in each benzene nucleus the para-position to the OH-group is substituted by a methyl group, $R_2$ and $R_3$ meaning H, and $R_1$ meaning an aromatic radicle, consisting in causing two molecular proportions of such unsulphonated hydroxycarboxylic acids of the benzene series in which the para-position to the OH-group is occupied by a substituent, to react, in presence of dehydrating agents and in the heat, on one molecular proportion of an aromatic diamine of the general formula

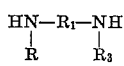

wherein $R_1$, $R_2$ and $R_3$ have the above mentioned significations.

8. Process for the manufacture of unsulphonated diacylated diamines of the general formula

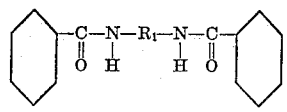

wherein each benzene nucleus carries an OH-group, and wherein in each benzene nucleus the para-position to the OH-group is substituted by a methyl group, $R_1$ standing for a radicle of the diphenyl series, consisting in causing two molecular proportions of such unsulphonated hydroxy-carboxylic acids of the benzene series in which the para-position of the OH-group is occupied by a substituent, to react, in presence of dehydrating agents and in the heat, on one molecular proportion of a diamine of the diphenyl series.

9. Process for the manufacture of unsulphonated diacylated diamines of the general formula

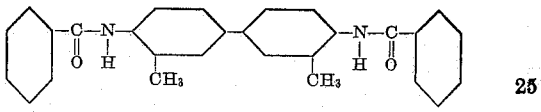

wherein each benzene nucleus carries an OH-group, and wherein in each benzene nucleus the para-position to the OH-group is substituted by a methyl group, consisting in causing two molecular proportions of such unsulphonated hydroxy-carboxylic acids of the benzene series in which the para-position to the OH-group is occupied by a substituent, to react, in presence of dehydrating agents and in the heat, on one molecular proportion of orthotolidine.

10. As new products the unsulphonated diacylated diamines of the general formula

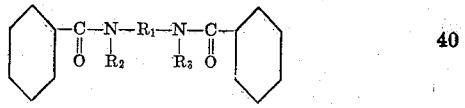

wherein each benzene nucleus carries an OH-group, and wherein in each benzene nucleus the para-position to the OH-group is substituted by a methyl group, $R_2$ and $R_3$ meaning H, and $R_1$ meaning an aromatic radicle, which products are soluble in caustic alkalies, have a pronounced affinity for vegetable fibers when in solution in dilute alkalies, react with diazo-compounds with formation of azo-dyestuffs, and are split by saponifying agents into diamines and such hydroxycarboxylic acids of the benzene series in which the para-position to the OH-group is occupied by a substituent.

11. As new products the unsulphonated diacylated diamines of the general formula

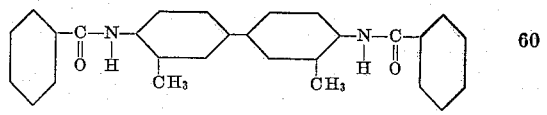

wherein each benzene nucleus carries an OH-group, and wherein in each benzene nucleus the para-position to the OH-group is substituted by a methyl group, which products form bright powders, are soluble in caustic alkalies, have a pronounced affinity for vegetable fibers when in solution in dilute alkalies, react with diazo-compounds with formation of azo-dyestuffs, and are split by saponifying agents into ortho-tolidine and such hydroxycarboxylic acids of the benzene series in which the para-position of the OH-group is occupied by a substituent.

12. Process for the manufacture of unsulphonated diacylated diamines of the general formula

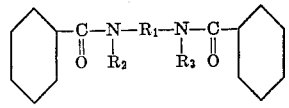

wherein each benzene nucleus carries an OH-group, and wherein in each benzene nucleus the para-position to the OH-group is substituted by an alkyl group, $R_2$ and $R_3$ meaning H, and $R_1$ meaning an aromatic radicle, consisting in causing two molecular proportions of such unsulphonated hydroxycarboxylic acids of the benzene series in which the para-position to the OH-group is occupied by a substituent, to react, in presence of dehydrating agents and in the heat, on one molecular proportion of an aromatic diamine of the general formula

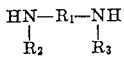

wherein $R_1$, $R_2$ and $R_3$ have the above mentioned significations.

13. Process for the manufacture of unsulphonated diacylated diamines of the general formula

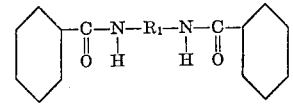

wherein each benzene nucleus carries an OH-group, and wherein in each benzene nucleus the para-position to the OH-group is substituted by an alkyl group, $R_1$ standing for a radicle of the diphenyl series, consisting in causing two molecular proportions of such unsulphonated hydroxycarboxylic acids of the benzene series in which the para-position to the OH-group is occupied by a substituent, to react, in presence of dehydrating agents and in the heat, on one molecular proportion of a diamine of the diphenyl series.

14. Process for the manufacture of unsulphonated diacylated diamines of the general formula

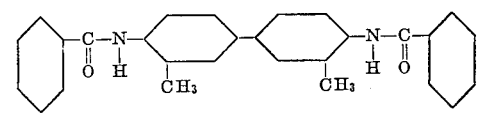

wherein each benzene nucleus carries an OH-group, and wherein in each benzene nucleus the para-position to the OH-group is substituted by an alkyl group, consisting in causing two molecular proportions of such unsulphonated hydroxycarboxylic acids of the benzene series in which the para-position to the OH-group is occupied by a substituent, to react, in presence of dehydrating agents and in the heat, on one molecular proportion of orthotolidine.

15. As new products the unsulphonated diacylated diamines of the general formula

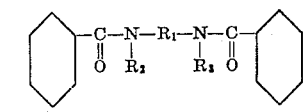

wherein each benzene nucleus carries an OH-group, and wherein in each benzene nucleus the para-position to the OH-group is substituted by an alkyl group, $R_2$ and $R_3$ meaning H, and $R_1$ meaning an aromatic radicle, which products are soluble in caustic alkalies, have a pronounced affinity for vegetable fibers when in solution in dilute alkalies, react with diazo-compounds with formation of azo-dyestuffs, and are split by saponifying agents into diamines and such hydroxycarboxylic acids of the benzene series in which the para-position to the OH-group is occupied by a substituent.

16. As new products the unsulphonated diacylated diamines of the general formula

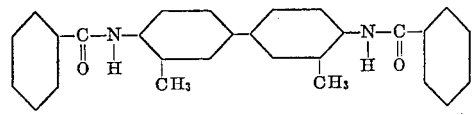

wherein each benzene nucleus carries an OH-group, and wherein in each benzene nucleus the para-position to the OH-group is substituted by an alkyl group, which products form bright powders, are soluble in caustic alkalies, have a pronounced affinity for vegetable fibers when in solution in dilute alkalies, react with diazo-compounds with formation of azo-dyestuffs, and are split by saponifying agents into ortho-tolidine and such hydroxy-carboxylic acids of the benzene series in which the para-position to the OH-group is occupied by a substituent.

17. Process for the manufacture of unsulphonated diacylated diamines of the following general formula

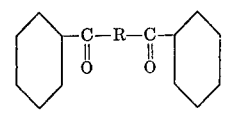

wherein each benzene nucleus carries an OH-group, and wherein in each benzene nucleus the para-position to the OH-group is substituted by an alkyl radical, and R meaning the radical of an aromatic diamine, consisting in causing two molecular proportions of such unsulphonated hydroxy-carboxylic acids of the benzene series in which the para-position to the OH-group is occupied by a substituent, to react in the presence of dehydrating agents and in the heat on one molecular proportion of an aromatic diamine.

18. As new products, the unsulphonated diacylated diamines of the following general formula

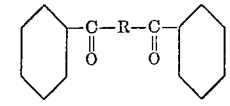

wherein each benzene nucleus carries an OH-group, and wherein in each benzene nucleus the para-position to the OH-group is substituted by an alkyl radical, and R meaning the radical of an aromatic diamine, which products are soluble in caustic alkalies, have a pronounced affinity for vegetable fibers when in solution in dilute alkalies, react with diazo compounds with formation of azo-dyestuffs, and are split by saponifying agents into diamines and such hydroxy-carboxylic acids of the benzene series in which the para-position to the OH-group is occupied by a substituent.

LEOPOLD LASKA.
OSKAR HALLER.